(12) United States Patent
Nagaraja et al.

(10) Patent No.: US 10,873,406 B2
(45) Date of Patent: *Dec. 22, 2020

(54) REFERENCE SIGNAL MEASUREMENT FILTERING IN MULTI-BEAM OPERATION

(71) Applicant: QUALCOMM Incorporated, San Diego, CA (US)

(72) Inventors: Sumeeth Nagaraja, Los Altos, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/551,329

(22) Filed: Aug. 26, 2019

(65) Prior Publication Data
US 2019/0386756 A1 Dec. 19, 2019

Related U.S. Application Data

(63) Continuation of application No. 15/708,883, filed on Sep. 19, 2017, now Pat. No. 10,396,914.
(Continued)

(51) Int. Cl.
*H04B 17/309* (2015.01)
*H04L 1/00* (2006.01)
(Continued)

(52) U.S. Cl.
CPC ......... *H04B 17/309* (2015.01); *H04B 7/0617* (2013.01); *H04B 17/327* (2015.01);
(Continued)

(58) Field of Classification Search
CPC .. H04B 17/309; H04B 17/327; H04B 7/0617; H04B 7/00; H04B 7/0632; H04B 7/0695;
(Continued)

(56) References Cited

U.S. PATENT DOCUMENTS 8,917,208 B2 12/2014 Niu et al.
9,282,531 B1 3/2016 Pajovic et al.
(Continued)

FOREIGN PATENT DOCUMENTS

GB 2350522 A 11/2000
WO 2016023227 A1 2/2016

OTHER PUBLICATIONS

International Search Report and Written Opinion—PCT/US2017/067051—ISP/EPO—Mar. 9, 2018.
(Continued)

*Primary Examiner* — Tejis Daya
(74) *Attorney, Agent, or Firm* — Patterson + Sheridan, LLP

(57) ABSTRACT

Techniques for performing reference signal measurement filtering in systems that support multi-beam operation are provided. A method for wireless communication by a base station (BS) includes determining at least one beam configuration for measuring reference signals transmitted from the apparatus, and signaling the beam configuration(s) to at least one user equipment (UE). A method for wireless communication by a UE includes receiving, from a BS, at least one beam configuration for measuring reference signals from the BS, and performing a measurement procedure for reference signals received from the BS based at least in part on the beam configuration(s).

20 Claims, 9 Drawing Sheets

Related U.S. Application Data

(60) Provisional application No. 62/448,375, filed on Jan. 19, 2017.

(51) Int. Cl.
*H04W 24/08* (2009.01)
*H04W 24/10* (2009.01)
*H04W 24/02* (2009.01)
*H04L 5/00* (2006.01)
*H04B 17/327* (2015.01)
*H04B 7/06* (2006.01)
*H04B 7/00* (2006.01)

(52) U.S. Cl.
CPC .............. *H04L 1/0026* (2013.01); *H04L 5/00* (2013.01); *H04L 5/0048* (2013.01); *H04W 24/02* (2013.01); *H04W 24/08* (2013.01); *H04W 24/10* (2013.01); *H04B 7/00* (2013.01); *H04B 7/0632* (2013.01); *H04B 7/0695* (2013.01)

(58) Field of Classification Search
CPC ....... H04L 5/00; H04L 1/0026; H04L 5/0048; H04W 24/08; H04W 24/10; H04W 24/02
See application file for complete search history.

(56) References Cited

U.S. PATENT DOCUMENTS

| | | |
|---|---|---|
| 9,923,702 B2 | 3/2018 | Wang et al. |
| 10,091,759 B2 | 10/2018 | Lin et al. |
| 10,396,914 B2 | 8/2019 | Nagaraja et al. |
| 2004/0214606 A1 | 10/2004 | Wichman et al. |
| 2005/0285792 A1 | 12/2005 | Sugar et al. |
| 2013/0010624 A1 | 1/2013 | He et al. |
| 2013/0223554 A1 | 8/2013 | Hong et al. |
| 2013/0344869 A1 | 12/2013 | Yamada |
| 2014/0073329 A1 | 3/2014 | Kang et al. |
| 2014/0105042 A1 | 4/2014 | Cui et al. |
| 2014/0177607 A1 | 6/2014 | Li et al. |
| 2015/0173004 A1 | 6/2015 | Nigam et al. |
| 2015/0304868 A1 | 10/2015 | Yu et al. |
| 2015/0372793 A1 | 12/2015 | Kang et al. |
| 2016/0105265 A1 | 4/2016 | Wang et al. |
| 2016/0150435 A1 | 5/2016 | Baek et al. |
| 2016/0197659 A1 | 7/2016 | Yu et al. |
| 2016/0255603 A1 | 9/2016 | Venkatraman et al. |
| 2017/0006593 A1 | 1/2017 | Liu |
| 2017/0141894 A1 | 5/2017 | Wei et al. |
| 2017/0150487 A1 | 5/2017 | Zhou et al. |
| 2017/0195100 A1 | 7/2017 | Kim et al. |
| 2017/0207843 A1 | 7/2017 | Jung et al. |
| 2017/0273058 A1 | 9/2017 | Agiwal et al. |
| 2017/0367069 A1 | 12/2017 | Agiwal et al. |
| 2020/0153581 A1* | 5/2020 | Tsai .................... H04L 27/2602 |
| 2020/0163074 A1* | 5/2020 | Tang .................... H04W 24/08 |

OTHER PUBLICATIONS

Qualcomm: "Beam Management for NR", 3GPP Draft; 3GPP TSG-RAN1 #88bis, R1-1705581, Beam Management for NR, 3RD Generation-Partnership Project (3GPP), Mobile Competence Centre, 650, Route Des Lucioles, F-06921 Sophia-Antipolis Cedex, France, vol. RAN WG1, No. Spokane, USA; 20170403-20170407, Apr. 2, 2017 (Apr. 2, 2017), XP051243709, pp. 1-7, Retrieved from the Internet: URL:http://www.3gpp.org/ftp/Meetings_3GPP_SYNC/RAN1/Docs/ [retrieved on Apr. 2, 2017] the whole document.

* cited by examiner

REFERENCE SIGNAL MEASUREMENT FILTERING IN MULTI-BEAM OPERATION

CROSS-REFERENCE TO RELATED APPLICATION

The present application is a continuation of U.S. patent application Ser. No. 15/708,883, filed Sep. 19, 2017, which claims benefit of U.S. Provisional Patent Application Ser. No. 62/448,375, filed Jan. 19, 2017, which is assigned to the assignee hereof and hereby expressly incorporated by reference herein.

BACKGROUND

Field of the Disclosure

Aspects of the present disclosure relate generally to wireless communications and, more particularly, to techniques for assisting a user equipment in performing measurements of reference signals transmitted via multiple beams.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure relate to methods and apparatus for performing reference signal (RS) measurement filtering in multi-beam operation. As described herein, the reference signals may be transmitted via one or more types of beams (or beam shapes).

Certain aspects of the present disclosure provide a method for wireless communication that may be performed, for example, by a base station (BS). The method generally includes determining a first beam configuration for measuring reference signals (RSs) transmitted from the BS. The method also includes signaling the first beam configuration to at least one user equipment (UE).

Certain aspects of the present disclosure provide a method for wireless communication that may be performed, for example, by a UE. The method generally includes receiving, from a BS, a first beam configuration for measuring RSs from the BS. The method also includes performing a measurement procedure for RSs received from the BS based at least in part on the first beam configuration.

Certain aspects of the present disclosure provide an apparatus for wireless communication. The apparatus generally includes means for determining a first beam configuration for measuring RSs transmitted from the apparatus. The apparatus also includes means for signaling the first beam configuration to at least one UE.

Certain aspects of the present disclosure provide an apparatus for wireless communication. The apparatus generally includes means for receiving, from a BS, a first beam configuration for measuring RSs from the BS. The apparatus also includes means for performing a measurement procedure for RSs received from the BS based at least in part on the first beam configuration.

Certain aspects of the present disclosure provide an apparatus for wireless communication. The apparatus generally includes at least one processor and a memory coupled to the at least one processor. The at least one processor is generally configured to determine a first beam configuration for measuring RSs transmitted from the apparatus. The at least one processor is also configured to signal the first beam configuration to at least one UE.

Certain aspects of the present disclosure provide an apparatus for wireless communication. The apparatus generally includes at least one processor and a memory coupled to the at least one processor. The at least one processor is generally configured to receive, from a BS, a first beam configuration for measuring RSs from the BS. The at least one processor is also configured to perform a measurement procedure for RSs received from the BS based at least in part on the first beam configuration.

Certain aspects of the present disclosure provide a computer-readable medium having computer executable code stored thereon for wireless communications by an apparatus. The computer executable code generally includes code for determining a first beam configuration for measuring RSs transmitted from the apparatus. The computer executable code also includes code for signaling the first beam configuration to at least one UE.

Certain aspects of the present disclosure provide a computer-readable medium having computer executable code stored thereon for wireless communications by an apparatus. The computer executable code generally includes code for receiving, from a BS, a first beam configuration for measuring RSs from the BS. The computer executable code also includes code for performing a measurement procedure for RSs received from the BS based at least in part on the first beam configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
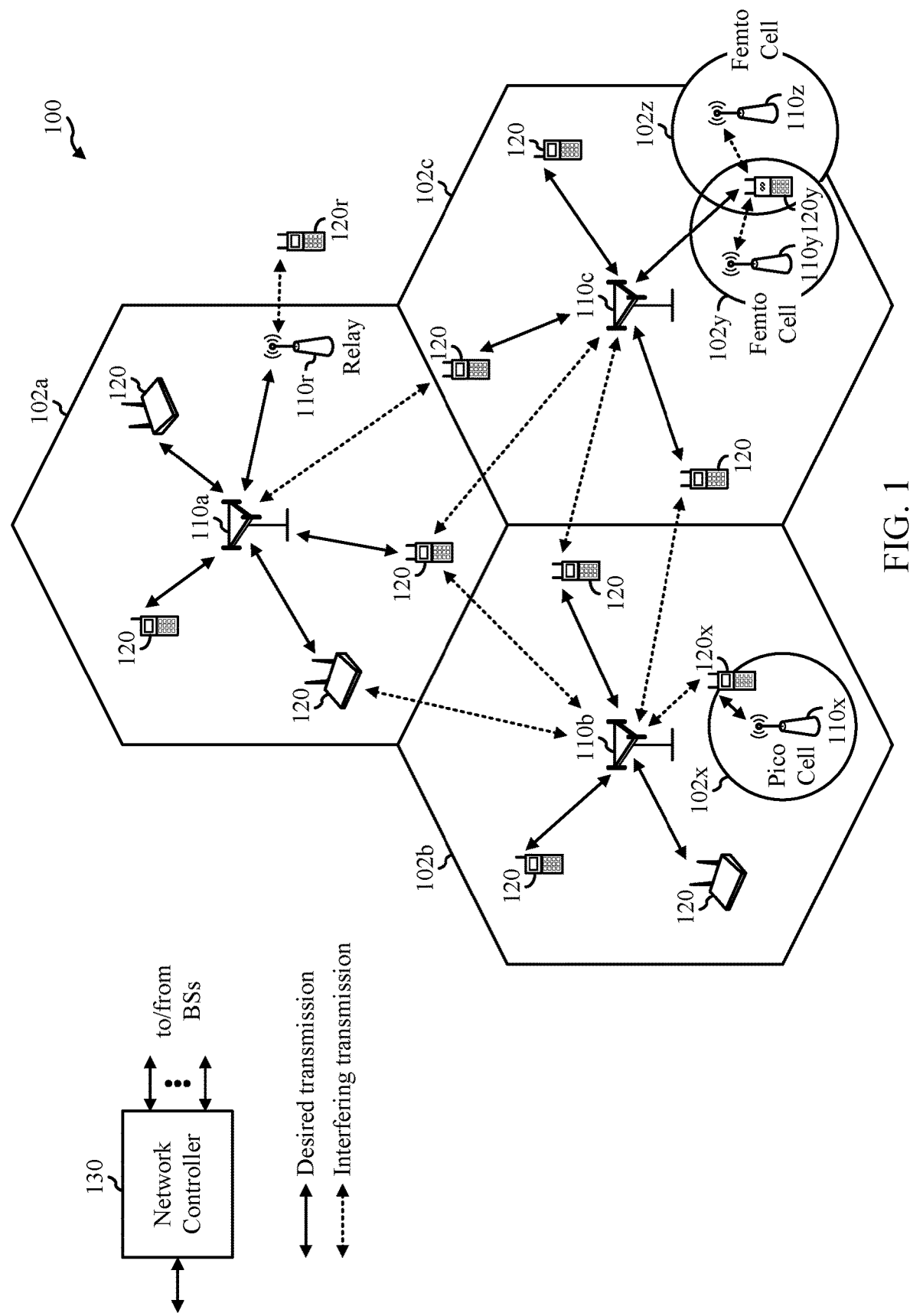
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to reference signal (RS) measurement filtering in multi-beam operation for wireless communications. In particular, aspects provide techniques for a base station (BS) to assist one or more user equipments (UEs) in performing measurement filtering of one or more RSs transmitted from the BS. In some aspects, the BS may determine one or more beam configurations for measuring RSs transmitted from the BS, and signal the beam configurations to at least one UE. Each beam configuration may include an indication of the beam shape used for the reference signals. In some cases, the beam configuration may also include an indication of whether the beam shape(s) is static or changes over time.

Once the UE receives an indication of a beam configuration, the UE may perform a measurement procedure for RSs received from the BS based on the beam configuration. In some aspects, if the UE receives an indication that a beam shape used for RSs is static (e.g., over one or more time periods), the UE may filter measurements of the RSs received from the BS. On the other hand, if the UE receives an indication that a beam shape used for RSs varies (e.g., over one or more time periods), the UE may refrain from filtering measurements of the RSs received from the BS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. Active beams may refer to BS and UE beam pairs that carry data and/or control channels such as PDSCH, PDCCH, PUSCH, and PUCCH. To facilitate beam selection and/or handover decisions, a UE may measure one or more RSs. The RSs may include, for example, NR synchronization signals (SS) (e.g., such as NR primary synchronization signal (NR-PSS), NR secondary synchronization signal (NR-SSS)), multi-port multi-beam reference signals (MRSs), channel state information reference signals (CSI-RSs), etc.

In scenarios where different types of beams are used to transmit the RSs, the UE may benefit from assistance in determining the type of measurement procedure to use to measure RSs transmitted from the BS via beams. That is, the UE may use different measurement procedures based on the particular type of beam (or beam shape) used by the BS to transmit the RSs.

As described herein, the UE may receive (from the BS) a beam configuration for measuring RSs transmitted from the BS. The RSs may be transmitted by the serving BS and/or one or more neighboring BSs. The beam configuration may include information regarding the beam shape used for the RSs, whether the beam shape of the RSs is static or changes over time, etc. The UE may determine the type of measurement procedure to use to measure the RSs received from the BS based on the beam configuration.

Absent this information, the UE may perform an incorrect measurement filtering process, which, in turn, can result in incorrect signal quality estimates and incorrect event triggers. Accordingly, aspects described herein allow for more efficient and accurate RS measurement by UEs.

As illustrated in FIG. 1, the wireless network 100 may include a number of BSs 110 and other network entities. BS 110 may comprise a transmission reception point (TRP), Node B (NB), 5G NB, access point (AP), new radio (NR) BS, etc.). BS 110 may be configured to perform the operations 900 and methods described herein for assisting a UE in performing measurement filtering of RSs transmitted via beams from the BS. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, gNodeB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. UEs 120 may be configured to perform the operations 1000 and methods described herein for performing measurement filtering of RSs transmitted via beams from a BS (e.g., BS 110). A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
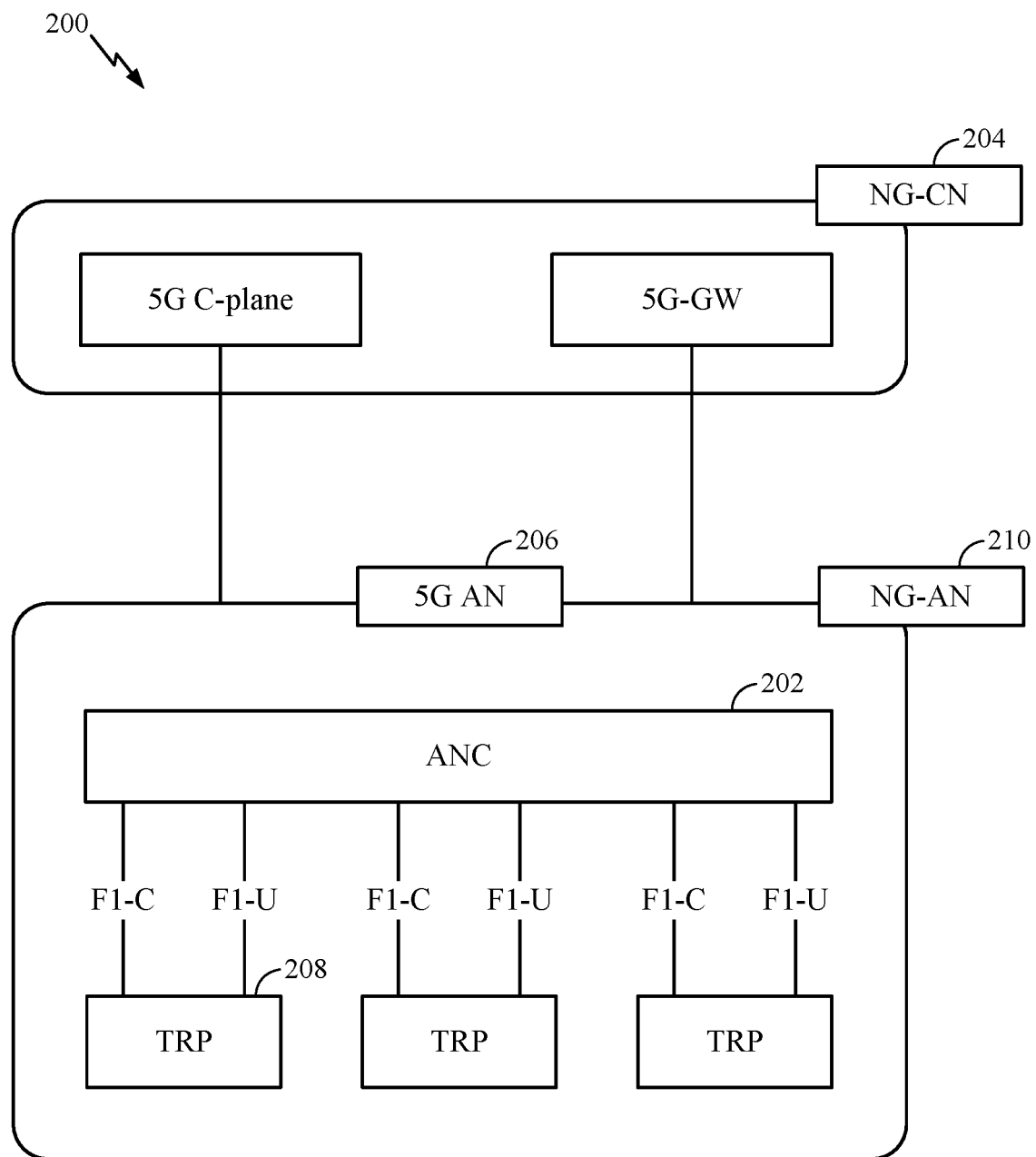
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
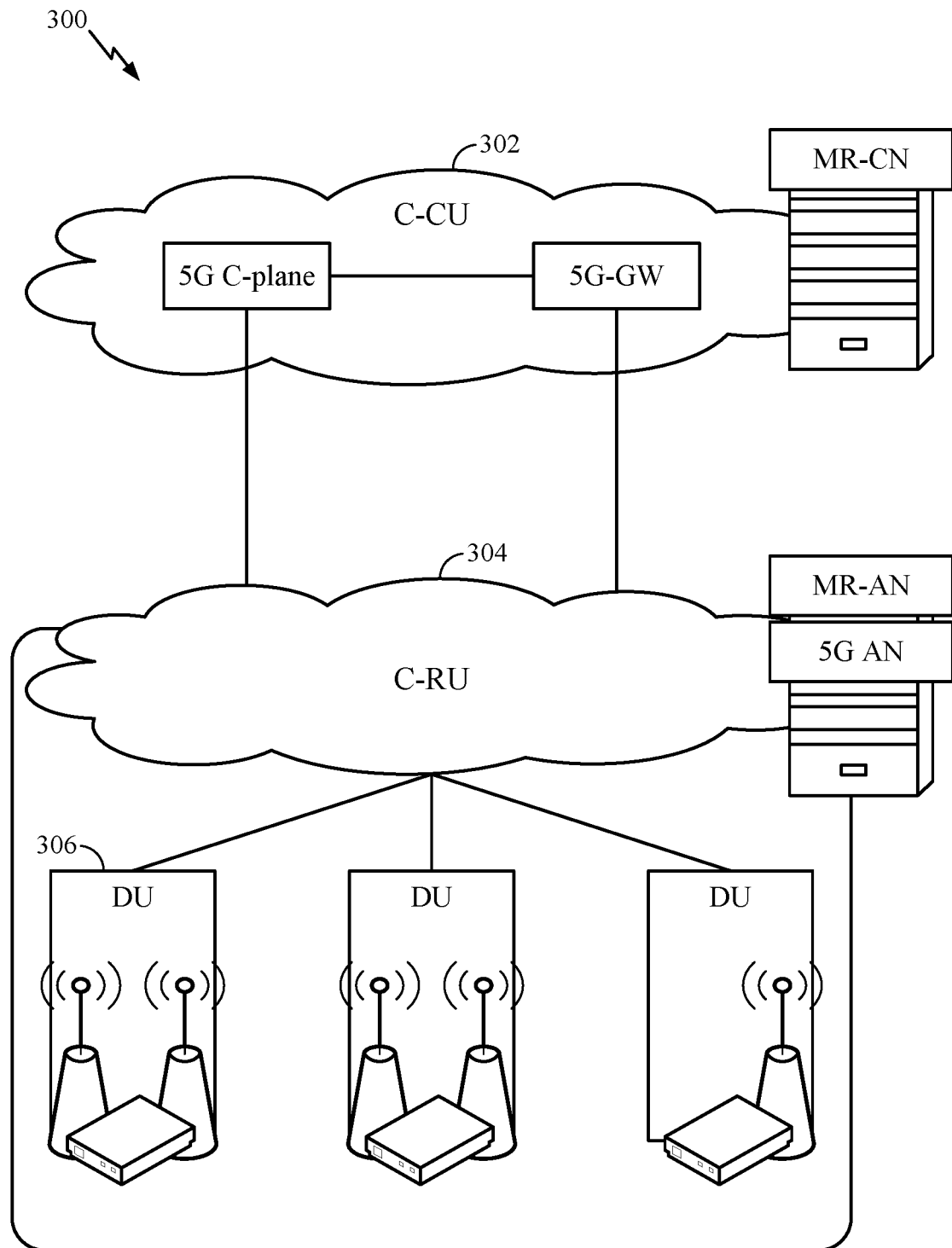
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
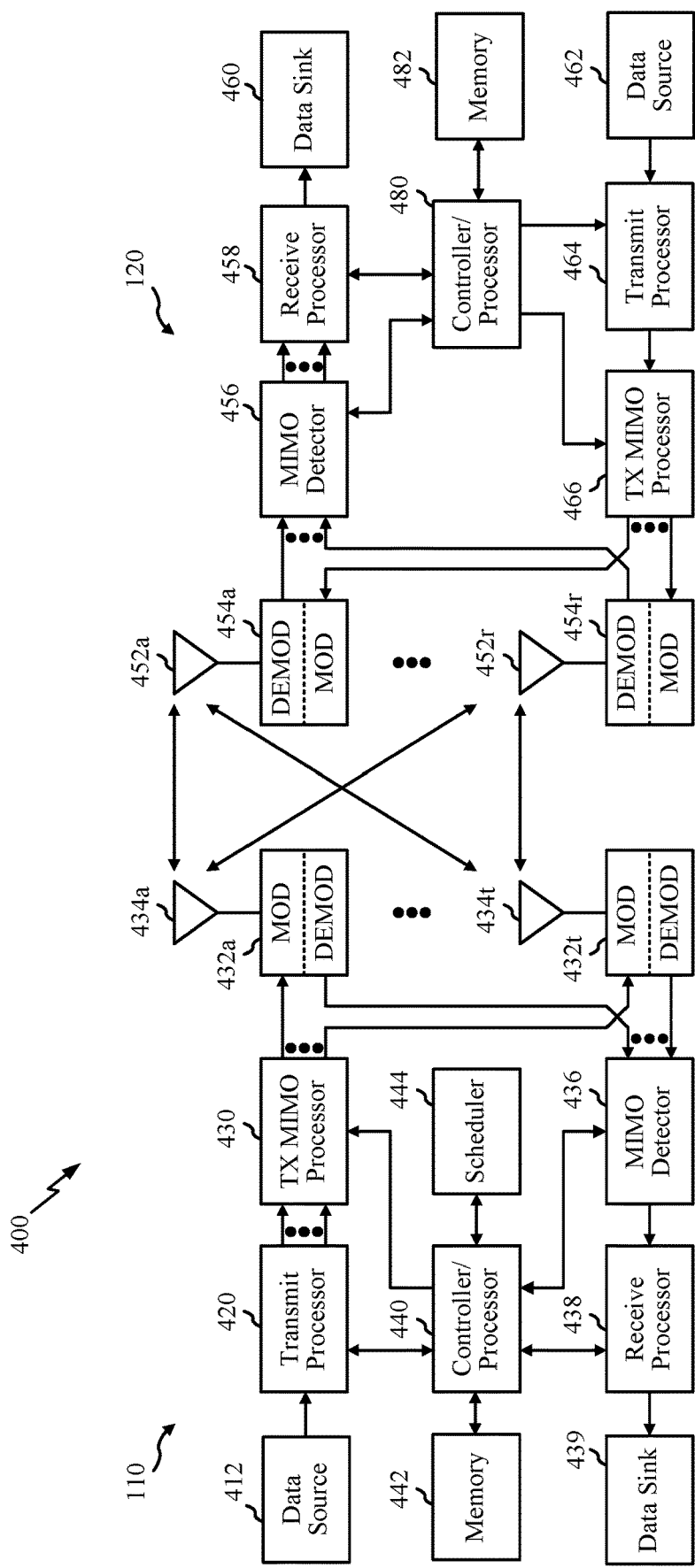
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the corresponding/complementary processes for the techniques described herein and as illustrated in FIG. 10. The memories 442 and 482 may store data and program codes for the BS 110 and the UE 120, respectively. A scheduler 444 may schedule UEs for data transmission on the downlink and/or uplink.

Figure 5:
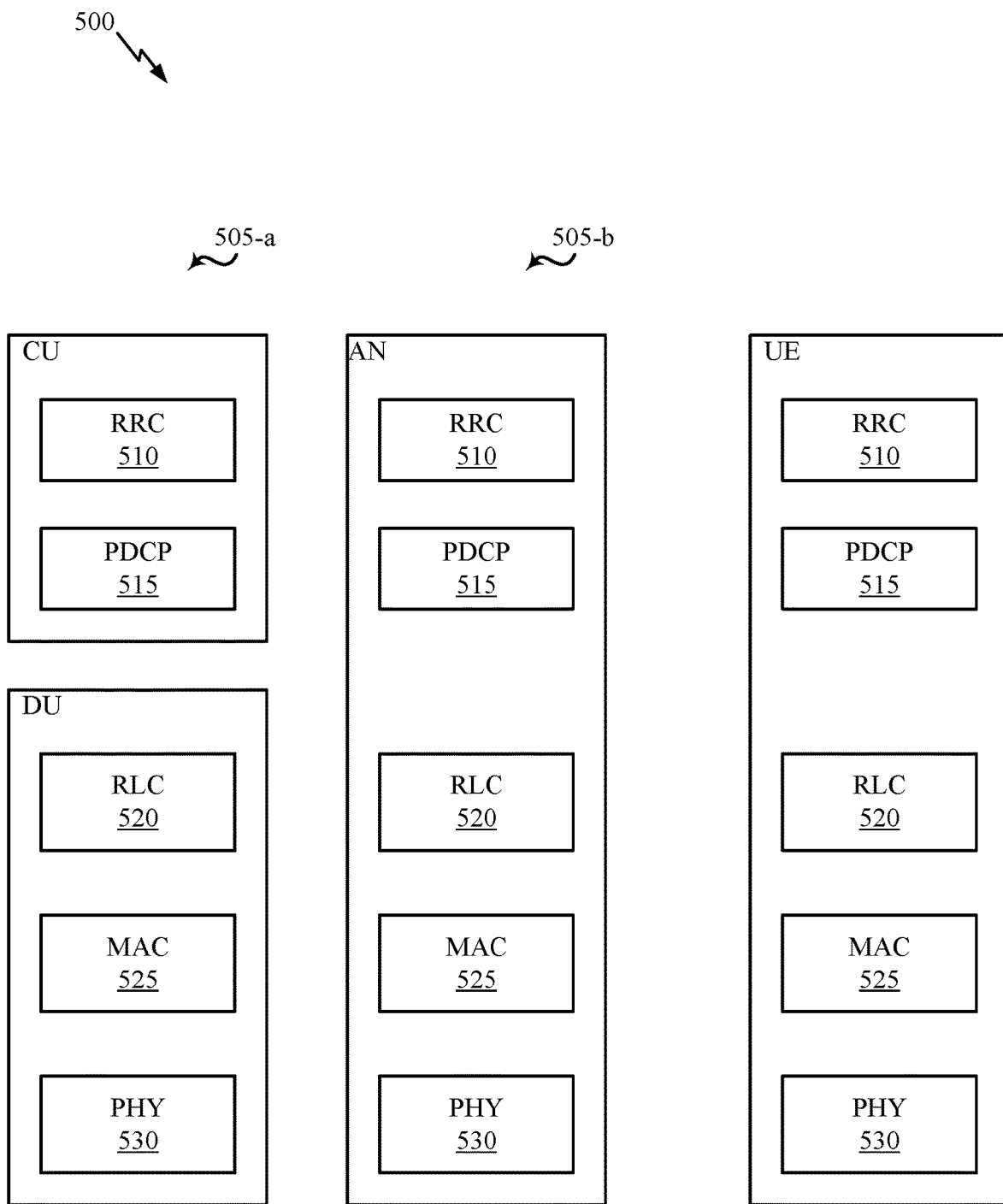
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
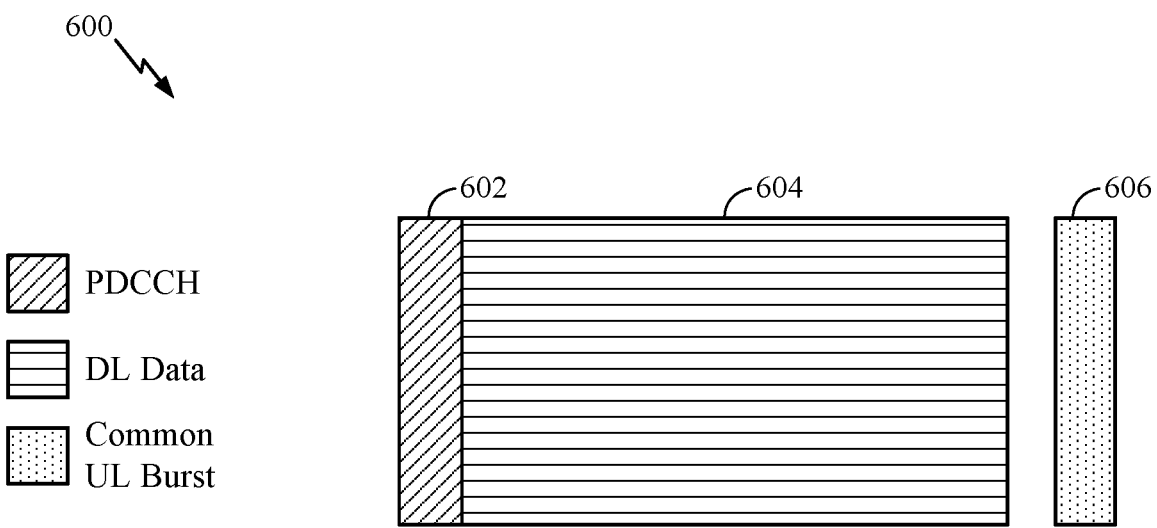
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
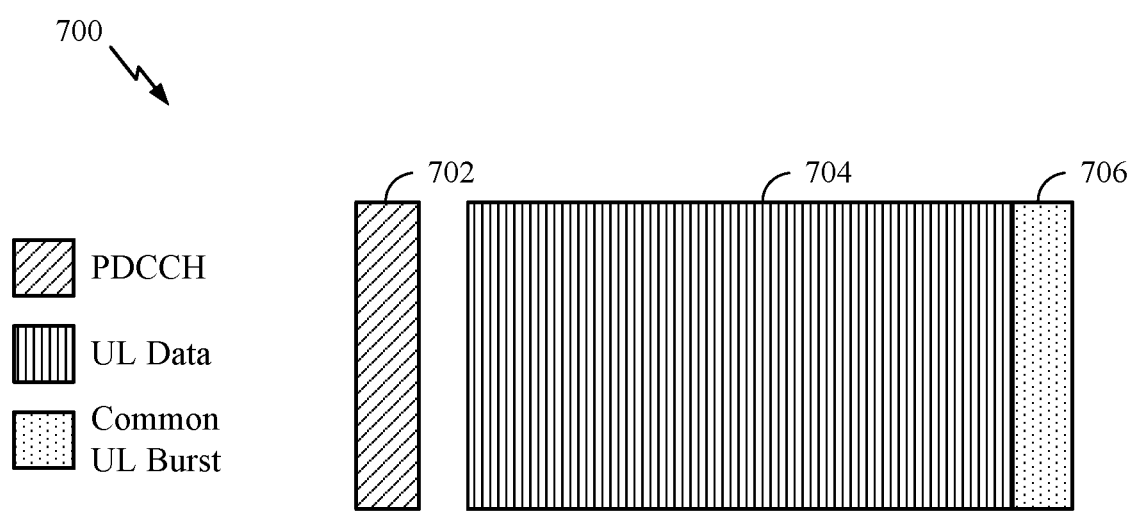
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

mmWave SYSTEMS

As used herein, the term mmWave generally refers to spectrum bands in very high frequencies such as 28 GHz. However, aspects of the present disclosure apply to any type of beamformed system (e.g., including sub-6 GHz).

Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using sets of beams for beam and cell mobility management.

Some legacy wireless communication standards base UE mobility decisions on cell-specific reference signals (CRS) transmitted by serving and target BSs. For example, a CRS may be transmitted in a radio frame, a UE may measure the CRS, and the UE may report a reference signal receive power (RSRP) associated with the measured CRS to the BS. Because every cell may transmit a CRS, the measured RSRP may be "linked" to a cell. Measuring CRS from a serving cell and one or more non-serving cells may be used to make handover decisions.

In some wireless system, a serving BS may not regularly transmit a CRS. Instead, for example, a reference signal may be transmitted on-demand or as needed. Accordingly, mobility decisions a communication system employing beams may be based on one or more reference beams.

Figure 8:
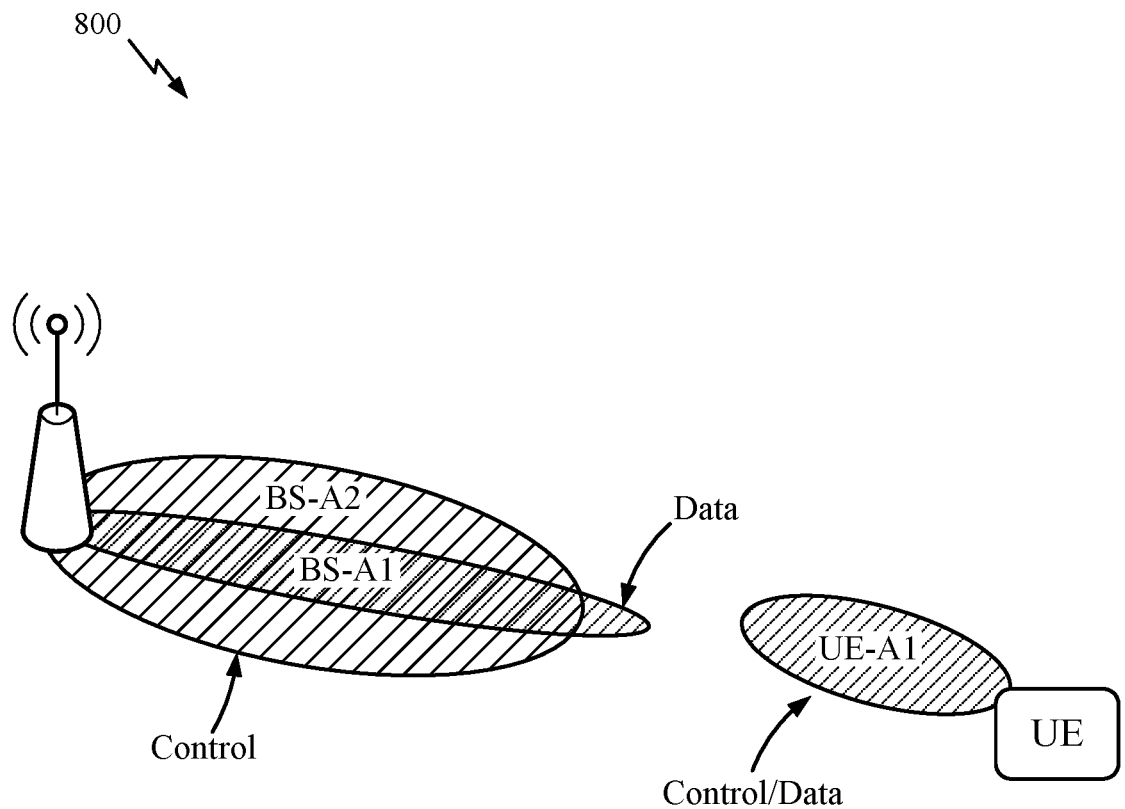
FIG. 8 illustrates an example of active beams, in accordance with certain aspects of the present disclosure.

FIG. 8 illustrates an example of active beams 800, in accordance with aspects of the present disclosure. ABS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information. A control beam, which may serve more than one UE, may be broader than a data beam. A control/data beam UE-A1 may be used to transmit both control and data. As illustrated, both UL control and data are transmitted using a same beam; however, the data and control information may be transmitted using different beams. Similarly, data and control may be transmitted by the BS using different beams or a same beam.

In wireless communication systems employing beams, such as mmWave systems, high path loss may present a challenge. Accordingly, techniques including hybrid beamforming (analog and digital), which are not present in 3G and 4G systems, may be used in such wireless systems. Hybrid beamforming creates narrow beam patterns to users (e.g., UEs), which may enhance link budget/SNR. As described above, a BS and UE may communicate over active beams. Active beams may be referred to as serving beams. Active beams may include BS and UE beam pairs that carry data and control channels such as PDSCH, PDCCH, PUSCH, and PUCCH.

ABS may monitor beams using beam measurements and feedback from a UE. For example, a BS may monitor active beams using DL reference signals. A BS may transmit a DL RS, such as a measurement reference signal, channel state information reference signal (CSI-RS), or a synchronization (synch) signal. A UE may report, to the BS, a reference signal receive power (RSRP) associated with a received reference signal. In this manner, the BS may monitor active beams.

Sets of active beams may have different functionalities, characteristics, and requirements. Stated otherwise, the functionalities of one or more active beams may be different than the functionalities other active beams. For example, a first set of active beams may include control beam and a second set of active beams may include data transmissions. As another example, beams in a first set of active beams may be transmitted in a first direction and beams in a second set of active beams may be transmitted in a second direction, different than the first direction. During multi-link communication, a UE may simultaneously be connected to a first BS in the first direction and to a second BS in the second direction. Beam shapes for each beam set of the active beams may vary. For example, as described above, the shape of control beams from a BS may be different than a shape of data beams from the same base station.

Example RS Measurement Filtering in Multi-Beam Operation

Aspects of the present disclosure provide methods and apparatus for assisting a UE in measuring RSs transmitted from a BS via multiple beams.

In multi-beam operation, multiple RSs may be present. Examples of such RSs can include NR-synchronization signals (SS) (e.g., NR-primary synchronization signal (NR-PSS), NR-secondary synchronization signal (NR-SSS), demodulation reference signal (DM-RS)), multi-port multi-beam reference signals (MRSs), and channel state information reference signals (CSI-RSs). Examples of MRSs include MRSs that are multiplexed in a block of SS resources (e.g., MRS-1) and/or MRS that are not multiplexed in a block of SS resources (e.g., MRS-2). In some cases, a CSI-RS may include MRS-1 and/or MRS-2. That is, while CSI-RS may have a UE-specific configuration, the beam transmission for CSI-RS may be cell-specific, UE-specific, or set of UEs specific.

In systems that support multi-beam operation, the beam shape of the reference signals may be static or change (vary) over time. For example, in many cases, the beam shape used for NR-SSs may be static over time. However, the beam shapes for RSs, such as MRS-1, MRS-2, CSI-RS, may depend on the particular operation performed by the BS. The information regarding whether a beam shape of a RS is static or varies over time may be beneficial to the UE when the UE performs measurements on the reference signals. For example, if the beam shape changes over time, performing a measurement filtering process over time (for different beam shapes) may result in incorrect signal quality estimates and consequently incorrect event triggers. Thus, it may be beneficial to provide the UE with the particular beam configuration to use for measuring RSs transmitted from the BS. Doing so can improve the quality of the RS measurements performed by the UE.

Aspects of the present disclosure provide techniques (that may be used in multi-beam operation) for a BS to configure the UE with information regarding the type of beam used for RS measurements. The BS may configure the UE to perform measurements on RSs that are transmitted periodically or semi-persistently. In particular, in order to assist the UE in performing measurements, the BS may indicate whether the beam shape of the RSs is static or changes over time (e.g., dynamic/varying).

Figure 9:
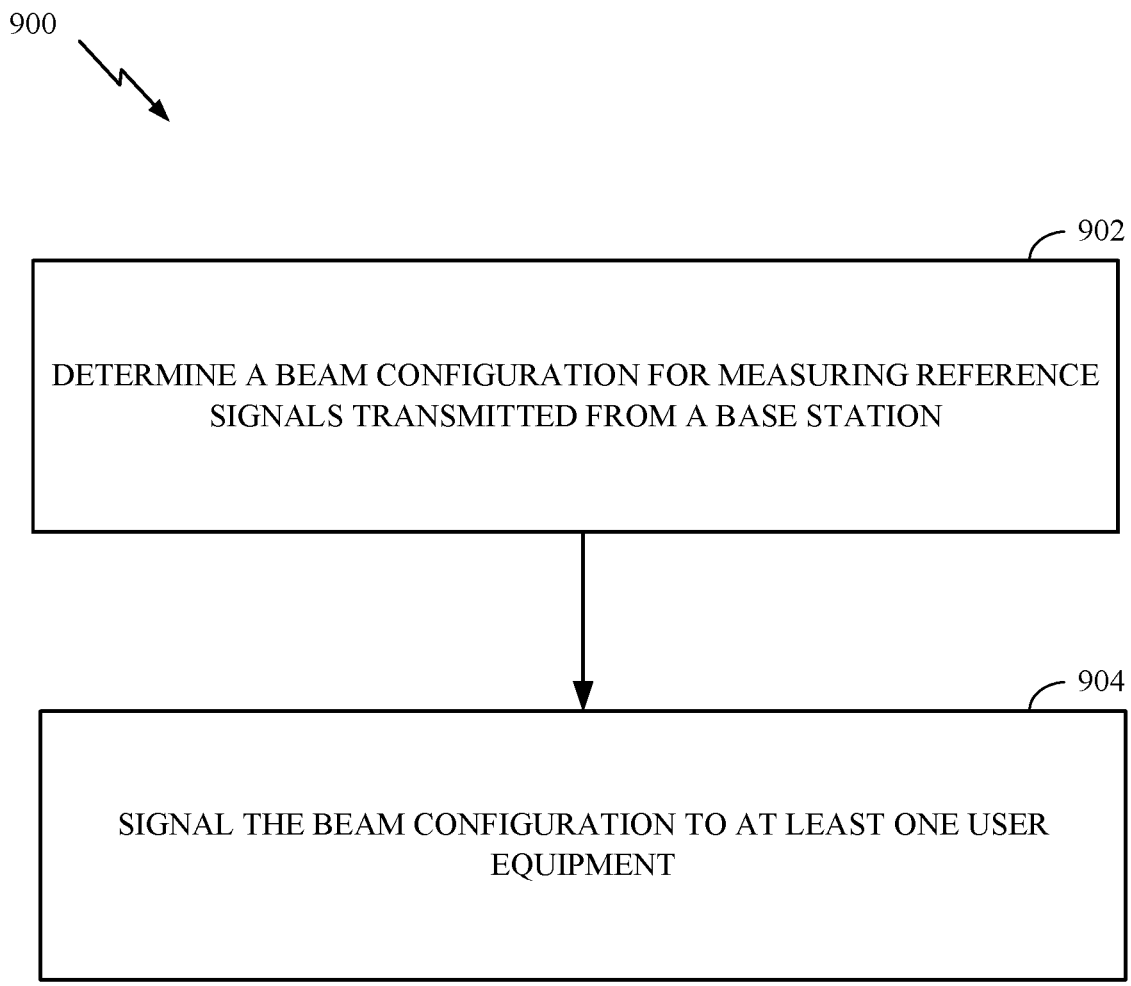
FIG. 9 illustrates example operations that may be performed by a BS, in accordance with certain aspects of the present disclosure.
Figure 10:
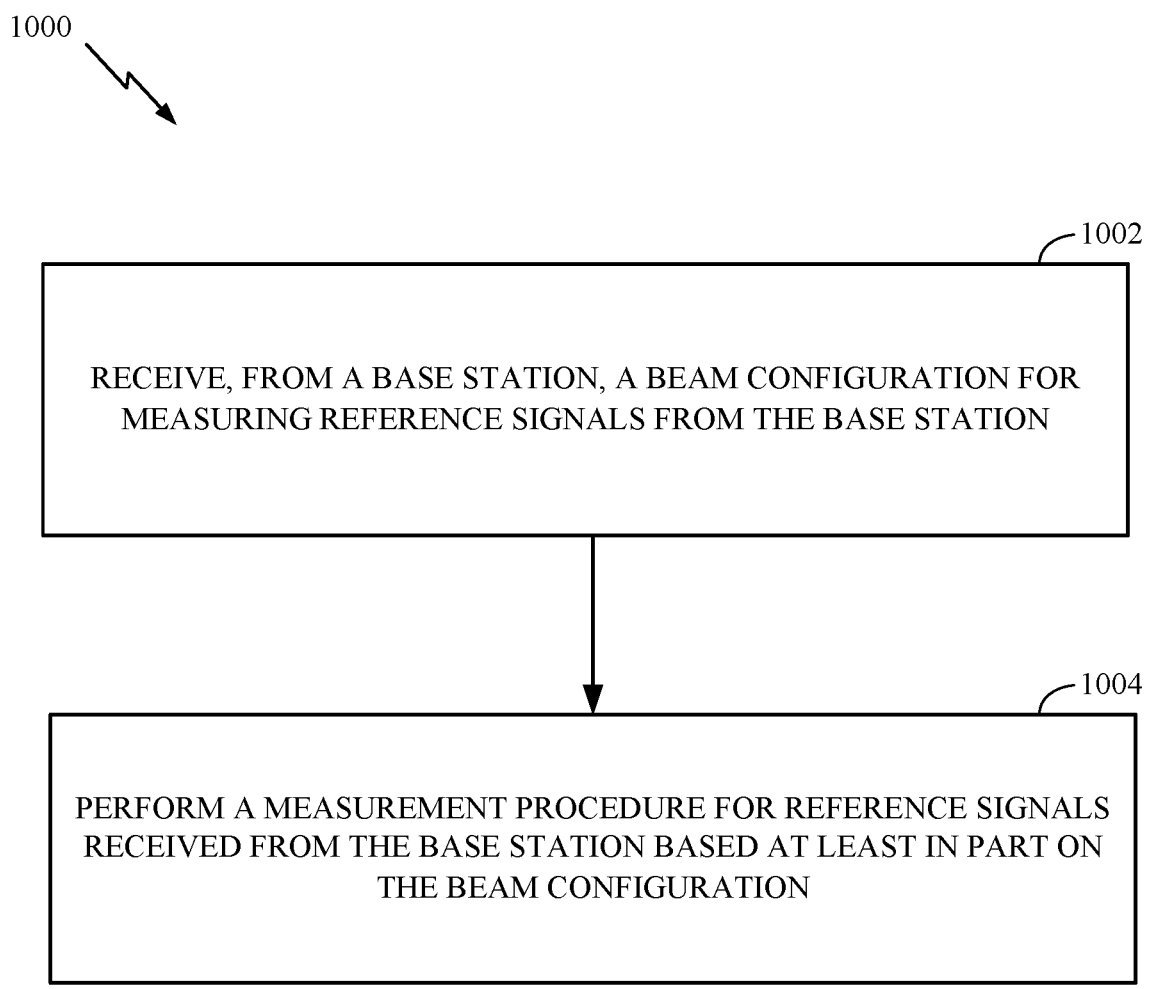
FIG. 10 illustrates example operations that may be performed by a UE, in accordance with certain aspects of the present disclosure.

FIG. 9 illustrates example operations 900 that may be performed by a BS (e.g., a NB). The BS may include one or modules of the BS 110 illustrated in FIG. 4.

Operations 900 begin at 902 where the BS determines a beam configuration for measuring RSs transmitted from the BS. The transmissions of RSs may be cell-specific, UE-specific, or set of UE specific. The RSs may include at least one of synchronization signals (SSs), MRSs, or CSI-RSs. The SSs may include at least one of a PSS, SSS or DM-RS. For example, in the case of NR-SS, the structure of NR-SS may include PSS, SSS and PBCH, which includes DM-RS. In this case, the offset between DM-RS and SSS can be signaled by the network. At least one of the MRSs may be transmitted in a block of SS resources. The transmission may occur in a SS block (e.g., MRS-1) or in control/data region.

At 904, the BS signals the beam configuration to at least one UE. In some aspects, the beam configuration may be signaled via at least one of layer 1 (L1), layer 2 (L2), or radio resource control (RRC) signaling. For example, in some cases, the beam configuration can be signaled via at least one of downlink control information (DCI) signaling, MAC control element (MAC CE) signaling, RRC signaling, etc. In some aspects, as described in more detail below, in addition to providing a beam configuration for measuring RSs, the BS can activate or deactivate measurement filtering performed by the UE via at least one of L1, L2, or RRC signaling.

FIG. 10 illustrates example operations 1000 which may be performed by UE, according to aspects of the present disclosure. The UE may include one or more modules of the UE 120 illustrated in FIG. 4.

Operations 1000 begin, at 1002, where the UE receives, from a BS (e.g., a NB), a beam configuration for measuring RSs from the BS. At 1004, the UE performs a measurement procedure for RSs received from the BS based at least in part on the beam configuration. In some aspects, the UE may receive another beam configuration for measuring RSs from the BS and modify the measurement procedure for the RSs based in part on the other beam configuration. For example, as described below, modifying the measurement procedure may include changing from a filtering mode to non-filtering mode, or vice versa. As noted above, the RSs received from the BS may include at least one of SSs, MRSs, or CSI-RSs. The SSs may include at least one of a PSS, SSS, or DM-RS. At least one of the MRSs may be received in a block of SS resources. In some cases, at least one of the MRSs may include one or more CSI-RS.

In some aspects, the beam configuration may include an indication of at least one type of beam used to transmit the RSs. Additionally, the beam configuration may include an indication of whether the beam shape is static or changes over time. For example, the beam configuration may include an indication of a set of time periods during which the type of beam used to transmit the RSs is static and/or a set of time periods during which the type of beam used to transmit the RSs varies.

In some cases, the beam configuration may include the start and end times for each time period (e.g., during which the beam shape is static or varies). For example, the start and end times can be indicated via at least one of system frame number (SFN), slot/mini-slot/symbol index, etc.

Additionally, in some cases, the beam configuration may indicate via a list of beam identifiers (beam-ids), system frame number and/or system frame index, the beams that are static over time and the beams that vary over time. For example, in one aspect, the beam configuration may include a first set of beam-ids that are associated with types of beams that are static over one or more time periods, and a second set of beam-ids that are associated with types of beams that vary over one or more time periods. Each beam-id may be associated with a different sub-band, different time, and/or different orthogonal code. That is, each beam-id may indicate a beam in at least one of time, frequency, or code domain.

In some aspects, the information associated with the beam-id may be based in part on a type of RS transmitted from the BS. For example, in the case of NR-SS, the information associated with the beam-id(s) may be carried in system information (e.g., via one or more system information blocks (SIBs)). In the case of CSI-RS, the information associated with the beam-id(s) may be defined in terms of CSI-RS resources, which may be sent as part of RRC reconfiguration. For example, the network can configure the UE, via RRC signaling, with a set of configurations that includes information for all beam-ids that will be used for CSI-RS. Once the network configures the UE with the set of configurations, the network can dynamically manage (e.g., activate/deactivate) the beam-id(s) via at least one of RRC signaling, DCI signaling, or MAC CE signaling. In general, however, the signaling of beam configurations and/or the indication of activated/deactivated beam-ids (e.g., for the configuration(s)) may be via at least one of DCI signaling, MAC CE signaling, RRC signaling, etc.

In some cases, the BS may determine multiple beam configurations, where each beam configuration is associated with a particular beam pattern (e.g., static or varying). For example, the BS may determine a first beam configuration that indicates a static beam pattern, and determine a second beam configuration that indicates a varying beam pattern, or vice versa. In some aspects, the BS may signal the change from a first beam configuration to the second beam configuration after detecting a change in mobility of the UE. In some aspects, the BS may signal a change to a different beam configuration based on prior reports from the UE, uplink measurements, etc. Based on uplink measurements, for example, the BS can determine whether the UE is mobile or stationary, and indicate a switch to a different beam configuration based on the determination.

In some aspects, the BS may signal a beam configuration for measuring a first type of RSs over a period of time as a relation to other beam configurations used for other types of RSs. For example, the BS may indicate that the beam configuration (or pattern) for MRS-1 is the same as the beam configuration for NR-SS. In one example, the BS may signal one or more parameter differences with respect to a beam configuration for a first RS (e.g., MRS-2) that the UE can use to derive the beam configuration for a second RS (e.g., MRS-1).

In some aspects, the BS (e.g., serving BS) may determine a beam configuration for measuring RSs transmitted from at least one neighboring BS, and signal the beam configuration to the UE(s). For example, in cases of RRC CONNECTED mobility, the serving BS may provide configuration for beams (e.g., duration/beam-ids that are static/changing) that are transmitted from neighbor BSs. In one reference example, the serving BS can indicate whether the neighbor BS transmits MRS-1 and/or MRS-2 beams in a static manner or dynamic manner. The serving BS may participate in a message exchange with the neighbor BSs to determine the configuration of the neighbor BSs. In some cases, the serving BS and neighbor BSs may share a common beam configuration.

In some aspects, after providing the UE with one or more beam configurations for measuring RSs, the BS may activate or deactivate a beam configuration via at least one of L1/L2 messaging (e.g., MAC CE signaling, DCI signaling, etc.) or RRC signaling. For example, in some cases, the BS may indicate via at least one of L1/L2 messaging or RRC signaling that, for the next X symbols/slots/mini-slots, the BS is going to hold the beam shape for the RSs constant. Similarly, in some cases, the BS may indicate via at least one of L1/L2 messaging or RRC signaling that, for the next X symbols/slots/mini-slots, the BS is going to change the beam shape.

As noted above, the UE may perform a measurement procedure for RSs received from the BS based in part on the beam configuration signaled from the BS. That is, the UE may determine to perform measurement filtering based on the BS Tx beam shape and/or whether the Tx beam shape of the RS is static or varies over time.

For example, if the BS indicates that the beam shape (e.g., for a set of beam-ids, start/end time(s)) for RSs is static, the UE may filter measurements of the RSs across the time periods that the beam shape is static. Similarly, if the BS indicates that the beam shape (e.g., for a set of beam-ids, start/end time(s))) for RSs is dynamic (or varies), the UE may not perform filtering over the duration of time that the beams vary. That is, the UE may combine the energy for the symbols corresponding to the particular beam (e.g., beam-id), as opposed to combining the energy across symbols corresponding to other beam-ids.

In this manner, the UE may change from a filtering mode to non-filtering mode, and vice versa, depending on the particular beam configuration used for transmitting RSs. Additionally, in some aspects, after receiving one or more beam configurations to use for measuring RSs transmitted from the BS, the UE may activate or deactivate measurement filtering for one or more time periods based on an indication received from the BS. For example, the UE can receive the indication from the BS (via at least one of L1, L2, or RRC signaling) regarding which of the beam configurations is activated or deactivated.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for signaling, means for indicating, means for configuring, means for obtaining, and/or means for receiving may comprise one or more of a transmit processor 420, a TX MIMO processor 430, controller/processor 440, a receive processor 438, or antenna(s) 434 of the base station 110 illustrated in FIG. 4 and/or the transmit processor 464, a TX MIMO processor 466, controller/processor 480, a receive processor 458, or antenna(s) 452 of the user equipment 120 illustrated in FIG. 4. Additionally, means for determining, means for identifying, means for activating, means for detecting, means for varying, means for performing, means for filtering, means for measuring, means for changing, means for generating, means for multiplexing, means for measuring, means for modifying, means for switching, means for refraining, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing measurement filtering of reference signals (RSs) for wireless communication by a user equipment (UE), comprising:
    receiving, from a base station (BS), an indication of a plurality of beam configurations for measuring reference signals (RSs) from the BS, wherein a first beam configuration of the plurality of beam configurations indicates at least a first type of beam for measuring a first type of RSs is static for the first type of RSs and a second beam configuration of the plurality of beam configurations indicates at least a second type of beam for measuring a second type of RSs is not static for the second type of RSs;
    receiving, from the BS, signaling that activates the first beam configuration or the second beam configuration; and
    performing a measurement procedure for RSs received from the BS based at least in part on whether the first beam configuration is activated or the second beam configuration is activated, comprising:
        filtering measurements of the first type of RSs if the first beam configuration is activated; and
        refraining from filtering measurements of the second type of RSs if the second beam configuration is activated.

2. The method of claim 1, wherein:
    the first beam configuration further comprises an indication of the first type of beam; and
    the second beam configuration further comprises an indication of the second type of beam.

3. The method of claim 1, wherein:
    the first beam configuration comprises a first set of beam identifiers (IDs) associated with a first set of resources used for the first type of RSs; and the second beam configuration comprises a second set of beam IDs associated with a second set of resources used for the second type of RSs.

4. The method of claim 1, wherein the first type of beam comprises a first beam shape and the second type of beam comprises a second beam shape.

5. The method of claim 1, wherein the indication of the plurality of beam configurations is received via radio resource control (RRC) signaling.

6. The method of claim 1, wherein the signaling that activates the first beam configuration or the second beam configuration is received via layer 1 (L1) signaling or layer 2 (L2) signaling.

7. The method of claim 1, wherein the first type of RSs comprises a first set of channel state information reference signals (CSI-RSs) and the second type of RSs comprises a second set of CSI-RSs.

8. An apparatus for wireless communication, comprising:
a receiver configured to:
receive, from a base station (BS), an indication of a plurality of beam configurations for measuring reference signals (RSs) from the BS, wherein a first beam configuration of the plurality of beam configurations indicates at least a first type of beam for measuring a first type of RSs is static for the first type of RSs and a second beam configuration of the plurality of beam configurations indicates at least a second type of beam for measuring a second type of RSs is not static for the second type of RSs; and
receive, from the BS, signaling that activates the first beam configuration or the second beam configuration;
at least one processor configured to perform a measurement procedure for RSs received from the BS based at least in part on whether the first beam configuration is activated or the second beam configuration is activated, the measurement procedure comprising:
filtering measurements of the first type of RSs if the first beam configuration is activated; and
refraining from filtering measurements of the second type of RSs if the second beam configuration is activated; and
a memory coupled to the at least one processor.

9. The apparatus of claim 8, wherein:
the first beam configuration further comprises an indication of the first type of beam; and
the second beam configuration further comprises an indication of the second type of beam.

10. The apparatus of claim 8, wherein:
the first beam configuration comprises a first set of beam identifiers (IDs) associated with a first set of resources used for the first type of RSs; and
the second beam configuration comprises a second set of beam IDs associated with a second set of resources used for the second type of RSs.

11. The apparatus of claim 8, wherein the first type of beam comprises a first beam shape and the second type of beam comprises a second beam shape.

12. The apparatus of claim 8, wherein the indication of the plurality of beam configurations is received via radio resource control (RRC) signaling.

13. The apparatus of claim 8, wherein the signaling that activates the first beam configuration or the second beam configuration is received via layer 1 (L1) signaling or layer 2 (L2) signaling.

14. The apparatus of claim 8, wherein the first type of RSs comprises a first set of channel state information reference signals (CSI-RSs) and the second type of RSs comprises a second set of CSI-RSs.

15. An apparatus for wireless communication, comprising:
means for receiving, from a base station (BS), an indication of a plurality of beam configurations for measuring reference signals (RSs) from the BS, wherein a first beam configuration of the plurality of beam configurations indicates at least a first type of beam for measuring a first type of RSs is static for the first type of RSs and a second beam configuration of the plurality of beam configurations indicates at least a second type of beam for measuring a second type of RSs is not static for the second type of RSs;
means for receiving, from the BS, signaling that activates the first beam configuration or the second beam configuration; and
means for performing a measurement procedure for RSs received from the BS based at least in part on whether the first beam configuration is activated or the second beam configuration is activated, comprising:
means for filtering measurements of the first type of RSs if the first beam configuration is activated; and
means for refraining from filtering measurements of the second type of RSs if the second beam configuration is activated.

16. The apparatus of claim 15, wherein:
the first beam configuration further comprises an indication of the first type of beam; and
the second beam configuration further comprises an indication of the second type of beam.

17. The apparatus of claim 15, wherein:
the first beam configuration comprises a first set of beam identifiers (IDs) associated with a first set of resources used for the first type of RSs; and
the second beam configuration comprises a second set of beam IDs associated with a second set of resources used for the second type of RSs.

18. The apparatus of claim 15, wherein the first type of beam comprises a first beam shape and the second type of beam comprises a second beam shape.

19. The apparatus of claim 15, wherein the indication of the plurality of beam configurations is received via radio resource control (RRC) signaling.

20. The apparatus of claim 15, wherein the signaling that activates the first beam configuration or the second beam configuration is received via layer 1 (L1) signaling or layer 2 (L2) signaling.

* * * * *